United States Patent
Barrett

[19]

[11] Patent Number: 6,151,222
[45] Date of Patent: Nov. 21, 2000

[54] DUAL VOLTAGE AUTOMOTIVE ELECTRICAL SYSTEM WITH SUB-RESONANT DC-DC CONVERTER

[75] Inventor: Alfred Henry Barrett, Carmel, Ind.

[73] Assignee: Delco Electronics Corp., Kokomo, Ind.

[21] Appl. No.: 09/261,878

[22] Filed: Mar. 2, 1999

[51] Int. Cl.$^7$ .................................................. H02M 3/335
[52] U.S. Cl. ............................................. 363/16; 363/17
[58] Field of Search .................................. 363/16, 17, 98, 363/131, 132

[56] References Cited

U.S. PATENT DOCUMENTS

| 4,525,774 | 6/1985 | Kino et al. | 363/17 |
| 5,388,040 | 2/1995 | Hall | 363/16 |

*Primary Examiner*—Peter S. Wong
*Assistant Examiner*—Rajnikant B. Patel
*Attorney, Agent, or Firm*—Jimmy L. Funke

[57] ABSTRACT

An improved dual voltage automotive electrical system in which low voltage loads are powered by a series resonant DC-DC converter operated at a fixed switching frequency below the resonant frequency of its tank circuit. With this arrangement, the converter provides a fixed conversion ratio from the regulated upper system voltage, and operates with the beneficial attributes of zero current switching and inherent overload protection. In a first embodiment, a transformer inductively couples the converter tank circuit to the low voltage loads, providing full input/output galvanic isolation. In a second embodiment, the converter is configured so that a portion of the power supplied to the low voltage loads is directly coupled from the upper system voltage source, with the remaining portion being coupled through the converter. In either embodiment, the accuracy of the conversion ratio and its load current independence are enhanced by a compounding coil having a load current dependent inductance coupled to the tank circuit.

10 Claims, 3 Drawing Sheets

DUAL VOLTAGE AUTOMOTIVE ELECTRICAL SYSTEM WITH SUB-RESONANT DC-DC CONVERTER

This invention relates to a dual voltage automotive electrical system, and more particularly to a system incorporating a series resonant DC-DC converter operated at a fixed sub-resonant switching frequency.

BACKGROUND OF THE INVENTION

With ever-increasing electrical power requirements in motor vehicles, dual voltage automotive electrical systems have been proposed as a means of improving the system operating efficiency. Typically, the alternator and storage battery operate at a relatively high voltage level (such as 42 volts) which is supplied to most of the high power electrical loads, and a DC-DC converter is used to supply power at a lower voltage (such as 14 volts) to certain loads such as lamps, small motors, and various electronic controllers. FIG. 1 depicts a dual voltage automotive electrical system 10, in which an engine or motor driven 42-volt alternator 11 is connected across storage battery 12 having a nominal terminal voltage of 36-volts. A voltage regulator 14 responsive to the upper system voltage on line 15 controls the excitation of alternator 11 so as to regulate the upper system voltage at the nominal 42-volts. The alternator 11 and/or storage battery 12 provide power directly to the majority of the electrical loads of the vehicle, designated as the 42V Loads 19. Various other loads, designated as the 14V Loads 20, are powered by the DC-DC converter 18, which converts the 42-volt input of alternator 11 and/or storage battery 12 to a nominal 14-volt output. The performance requirements of the converter 18 include: low cost, high reliability, long life at high operating temperatures, high power density, light weight, low conducted and radiated emissions (electromagnetic compatibility), and protection against overload and reverse polarity.

The most common approaches in converter design for the dual-voltage automotive application are illustrated in FIGS. 2 and 3, where the converter 18 is designated respectively by the reference numerals 18a and 18b. In each case, the input voltage is depicted as 42-volts, and the converter supplies power at an output voltage of 14-volts. In the approach of FIG. 2, a power-FET Q1 connected between input capacitor C1 and inductor L1 is pulse-width-modulated to charge an output capacitor C2 and deliver power to the 14V Loads 19 through the inductor L1. During off periods of the FET Q1, energy stored in inductor L1 is circulated through output capacitor C2 and the 14V Loads 19 via free-wheeling diode D1. If desired, the diode D1 can be replaced with another FET controlled in relation to the conduction of FET Q1 to provide synchronous rectification. In FIG. 3, the converter 18b transfers power through a center-tapped step-down transformer T1 to provide isolation between the input and output; in this case, the FETs Q1 and Q2 are pulse-width-modulated to excite the transformer primary windings P1 and P2, with the diodes D2 and D3 rectifying the voltage appearing across the transformer secondary windings S1 and S2. The inductor L1, the capacitors C1 and C2, and the free-wheeling diode D1 are identical to those shown in the converter of FIG. 2.

The converters of FIGS. 2 and 3 are characterized by high switching losses, particularly at higher operating frequencies. In general, these losses limit the operating frequency to about 100 kHz or lower, especially at power levels above about several hundred watts. Additionally, there is no inherent overload protection, and the hard switching produces unacceptably high electromagnetic interference without substantial filtering. As a result, it is difficult to meet the objectives of low cost, high reliability and long life at high operating temperatures.

SUMMARY OF THE INVENTION

The present invention is directed to an improved dual voltage automotive electrical system in which low voltage loads are powered by a series resonant DC-DC converter operated at a fixed switching frequency below the resonant frequency of its tank circuit. With this arrangement, the converter provides a fixed conversion ratio from the regulated upper system voltage, and operates with the beneficial attributes of zero current switching and inherent overload protection.

In accordance with a first embodiment, a transformer inductively couples the converter tank circuit to the low voltage loads, providing full input/output galvanic isolation. In accordance with a second embodiment, the converter is configured so that a portion of the power supplied to the low voltage loads is directly coupled from the upper system voltage source, with the remaining portion being coupled through the converter. In either embodiment, the accuracy of the conversion ratio and its load current independence are enhanced by a compounding coil having a load current dependent inductance coupled to the tank circuit.

DETAILED DESCRIPTION OF THE DRAWINGS

FIGS. 4–9 depict dual voltage automotive electrical systems according to this invention in a non-exhaustive illustration of different mechanizations. In each of the illustrated embodiments, the upper system voltage is given as 42-volts, and the lower system voltage is given as 14-volts, but it will be recognized that such values are illustrative, and not limiting. Also, it will be recognized that the invention equally applies to an electrical system in which the converter is dedicated to a single lower voltage load, or in which there are two or more lower voltage loads, one or more of which has its own converter. In other words, there may be several lower supply voltages, with one or more of the lower voltages being dedicated to a single load device. Obviously, many different configurations are possible, and no attempt is made herein to generate an exhaustive listing of the possibilities.

The common thread among the various embodiments of this invention is the use of a series resonant DC-DC converter, operating at a fixed sub-resonant frequency, to deliver power to the 14V Loads. Ordinarily, a resonant DC-DC converter is used as a variable voltage conversion device, with the switching frequency of the tank circuit being controlled to regulate the output voltage to a desired value. According to the present invention, however, the switching frequency is maintained at a fixed value to provide a fixed voltage conversion ratio, with the regulation being provided by the alternator voltage regulator 14. An additional and particularly advantageous aspect of the present invention is that the switching frequency is set to value lower than the resonant frequency of the converter tank circuit, and preferably at about one-half the resonant frequency. This ensures zero current switching of the tank circuit even during overload conditions, and provides inherent overload protection, as described below.

Figure 1:
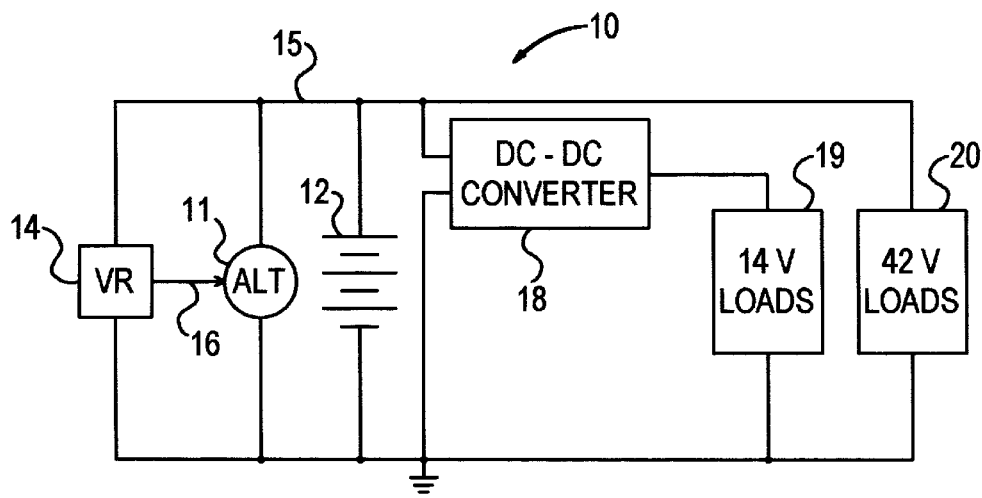
FIG. 1 is a block diagram of a known dual voltage automotive electrical system.
Figure 2:
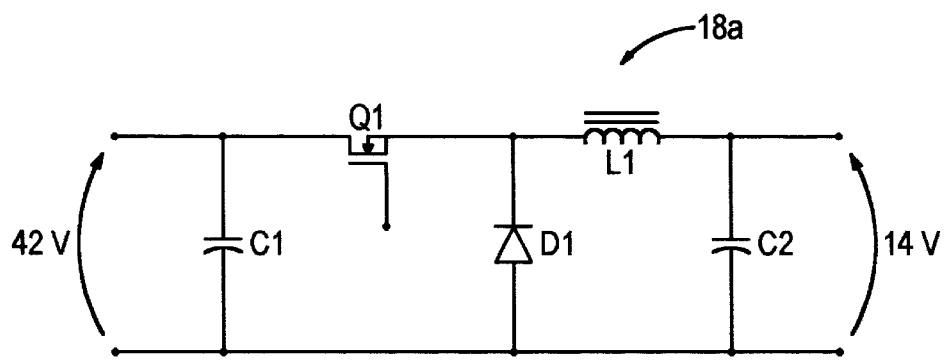
FIG. 2 is a circuit diagram of a known non-resonant DC-DC converter, without input/output galvanic isolation, in the context of the electrical system of FIG. 1.
Figure 3:
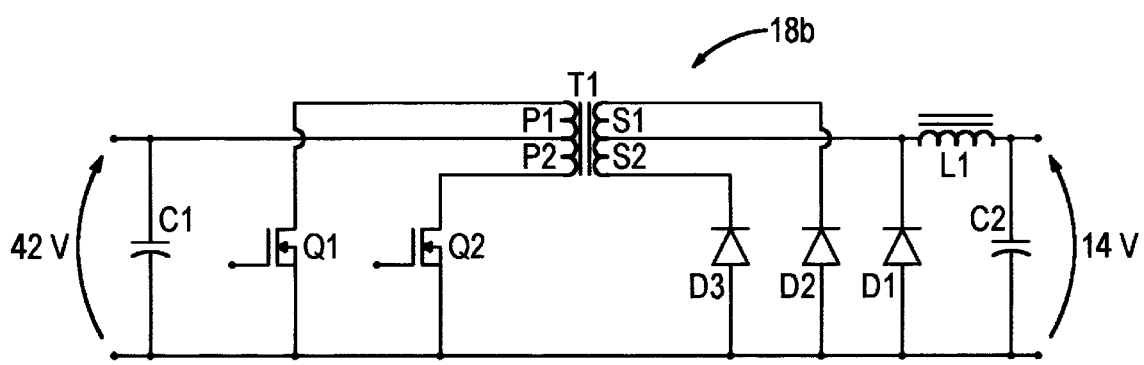
FIG. 3 is a circuit diagram of a known non-resonant DC-DC converter, with full input/output galvanic isolation, in the context of the electrical system of FIG. 1.
Figure 4:
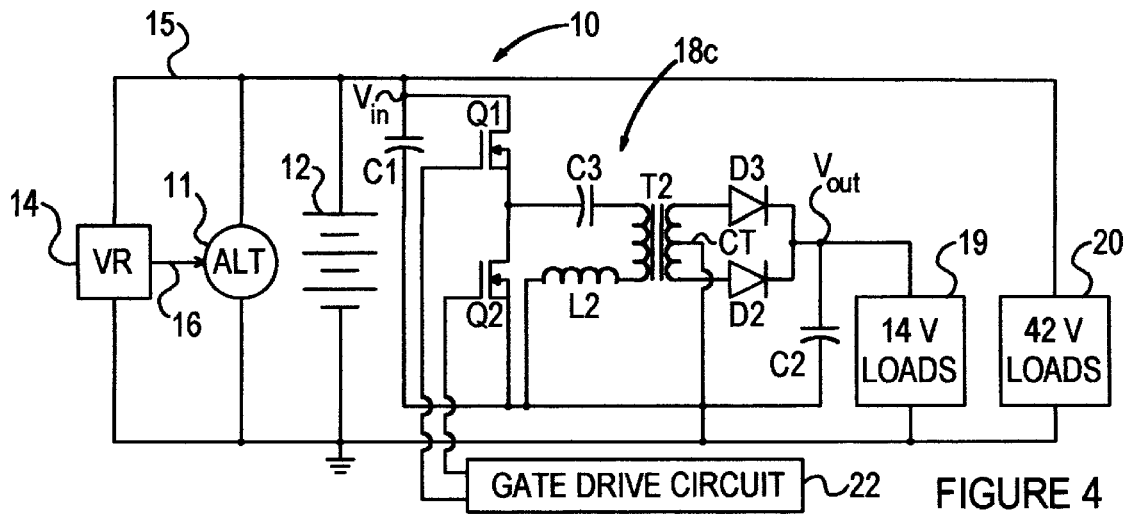
FIG. 4 is a diagram of a dual voltage automotive electrical system according to a first embodiment of this invention, including a series resonant DC-DC converter, with full galvanic input/output isolation, operated at a fixed sub-resonant switching frequency.
Figure 5:
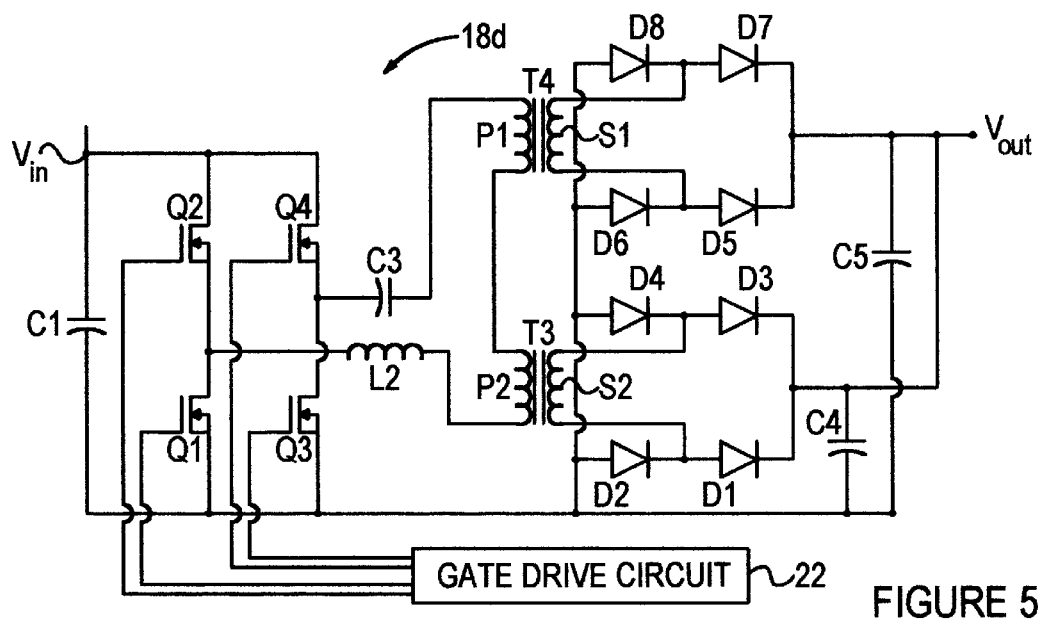
FIG. 5 is a circuit diagram of a first variation of the DC-DC converter depicted in FIG. 4.
Figure 6:
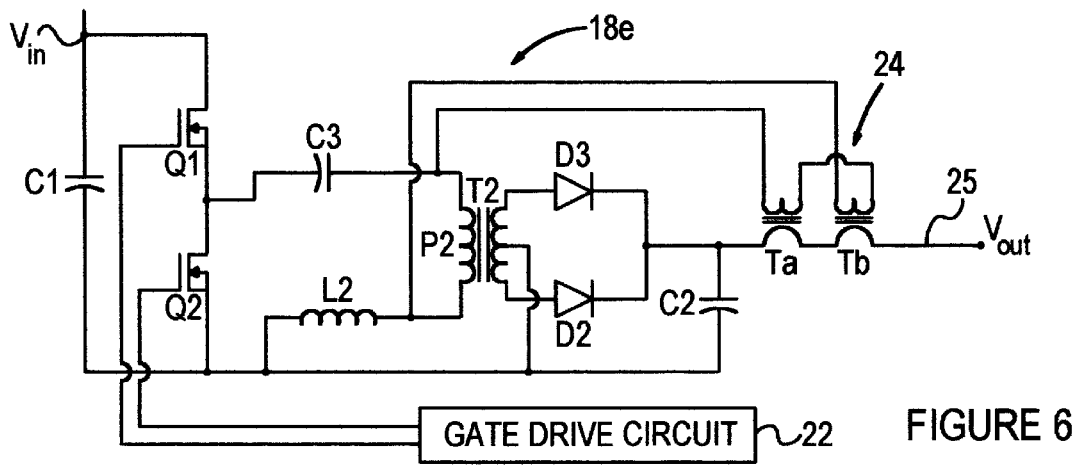
FIG. 6 is a circuit diagram of a second variation of the DC-DC converter depicted in FIG. 4.

FIGS. 4–6 depict a first embodiment of the invention, in which the converter provides full input/output galvanic isolation. Referring to FIG. 4, the converter 18c is connected in the electrical system 10 substantially as shown in FIG. 1. The power transistors Q1 and Q2 (which may be FETs as shown, or IGBTs), configured as a half-wave bridge, connect the series connected tank elements C3 and L2 between the upper system voltage line 15 and the common or chassis ground. The tank circuit also includes the primary winding of transformer T2, and has a single resonant pole at a frequency where the impedance of capacitor C1 equals that of inductor L2 and the leakage inductance of the transformer T2. In practice, the inductor L2 may be eliminated if the transformer leakage inductance is sufficiently high to achieve the desired resonant frequency. The transistors Q1 and Q2 are alternately biased on and off at a fixed switching frequency by the gate drive circuit 22 to excite the tank circuit with alternating current. The center tap CT of the transformer secondary winding is connected to common ground, and the ends of the secondary winding are coupled through diodes D2 and D3 which full-wave rectify the tank energy inductively coupled through the transformer T2. Thus, the output is effectively supplied in series with the tank circuit. As in FIG. 2–3, the input capacitor C1 is connected between the 42-volt input (Vin) and common ground, and the output capacitor C2 is connected between the 14-volt output (Vout) and the common ground.

FIG. 5 illustrates a variation, designated by the reference numeral 18d, of the converter topology of FIG. 4, but in general, the operating characteristics are the same or very similar. In the converter 18d, the half-wave bridge is replaced by a full-wave bridge comprising transistors Q1–Q4, the single transformer T2 is replaced by a pair of transformers T3 and T4, with both primary windings P1 and P2 being connected in the series tank circuit, and the transformer secondary windings S1 and S2 are not center-tapped. This embodiment requires a pair of full-wave diode bridges comprising the diodes D1–D8, with the bridge outputs being connected to the output Vout in parallel. In the transistor bridge, diagonally connected transistors Q2 and Q3 are turned on and off in unison, as are the diagonally connected transistors Q1 and Q4. These and other topology variations may be used in a variety of combinations, depending on efficiency, size and cost considerations.

In the embodiments of FIGS. 4–5, the turns ratio of the tank transformers T2–T4 are chosen so that the fixed conversion ratio provided by the respective converter 18 is approximately 3:1. In the embodiment of FIG. 4, the transformer T2 has a turns ratio of 3:2:2, since transistor Q1 and Q2 are connected in a half-wave configuration. If a full-wave bridge were used, the turns ratio would be 3:1:1. In the embodiment of FIG. 5 with a full-wave bridge driving two transformers T3 and T4, both transformers T3 and T4 have a turns ratio of 3:2.

FIG. 6 illustrates a further variation, designated by the reference numeral 18e, of the converter topology of FIG. 4, in which a compounding coil pair 24 is connected in parallel with the primary winding P2 of the transformer T2. Each of the coils 24 is actually the secondary winding of a low turn transformer Ta, Tb, with the primary turns being connected in the converter output line 25. This topology variation, which enhances the accuracy of the conversion ratio and the load current independence of the converter, is also applied to the second embodiment of this invention, and is described below in some detail in respect to FIG. 9.

Figure 7:
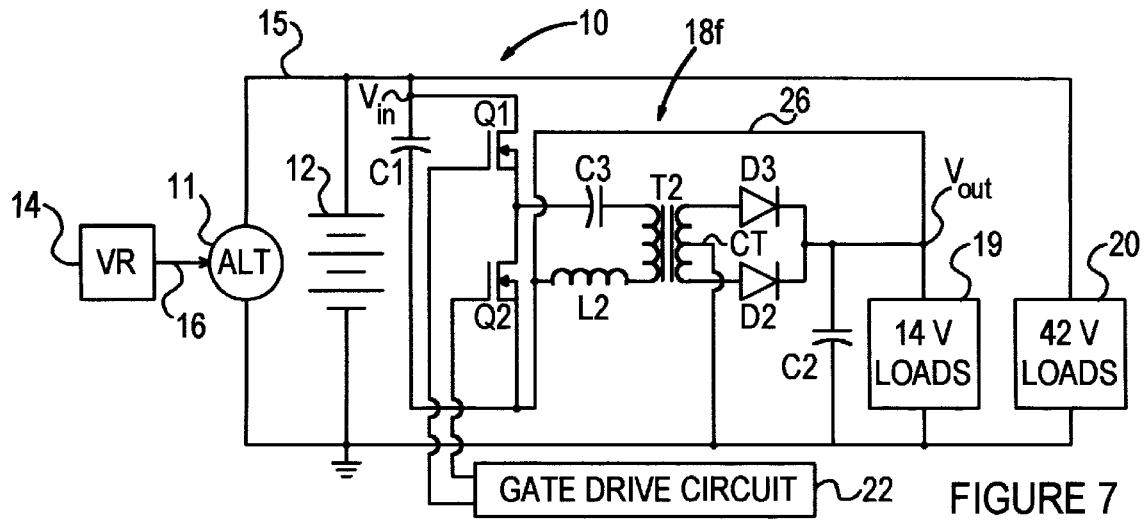
FIG. 7 is a diagram of a dual voltage automotive electrical system according to a second embodiment of this invention, including a series resonant DC-DC converter, with partial input/output galvanic isolation, operated at a fixed sub-resonant switching frequency.
Figure 8:
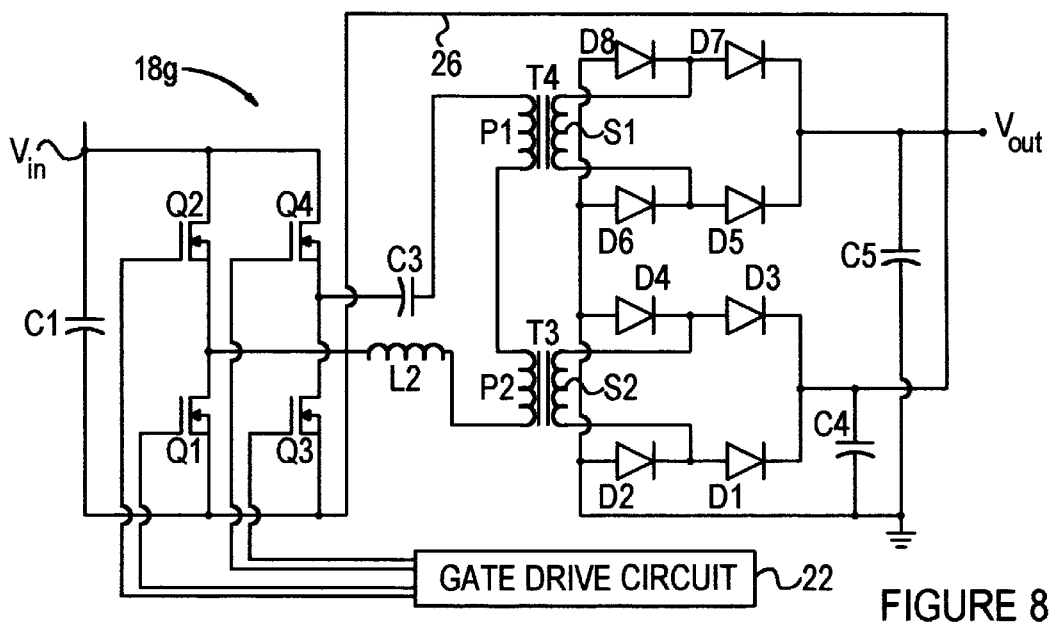
FIG. 8 is a circuit diagram of a first variation of the DC-DC converter depicted in FIG. 7.
Figure 9:
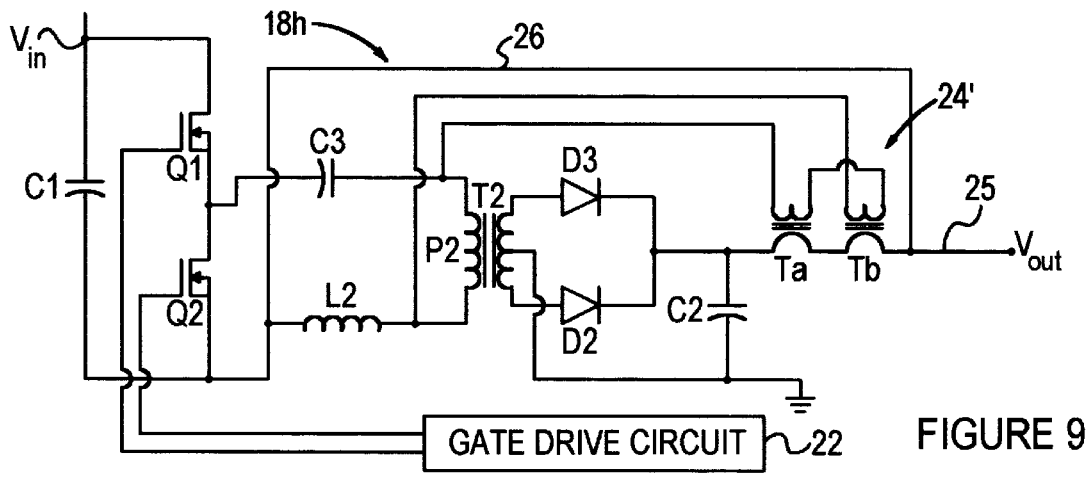
FIG. 9 is a circuit diagram of a second variation of the DC-DC converter depicted in FIG. 7.

FIGS. 7–9 depict a second embodiment of the invention, in which the low side of the converter's transistor bridge is directly connected to the output terminal Vout via line 26 instead of the common or chassis ground. This effectively creates a voltage divider circuit between the converter circuit components and the 14V Loads 19. Thus, a portion of the power consumed by the 14V Loads 19 is inductively coupled to the output terminal Vout through the converter 18f, and the remaining portion is directly coupled to Vout via line 26. In other respects, the converters 18f, 18g and 18h of FIGS. 7, 8 and 9 are similar to the converters 18c, 18d and 18e of FIGS. 4, 5 and 6, respectively.

The implications of the power partitioning inherent in the embodiments of FIGS. 7–9 are significant, primarily because the power ratings of the converter components can be reduced in proportion to the fraction of power transferred directly to the 14V Loads 19. Under normal conditions, the output voltage Vout is maintained at 14-volts, so that the transistor bridge switches only 28-volts instead of the full 42-volts. Thus, two-thirds of the power consumed by the 14V Loads 19 is coupled inductively through the transistor bridge and converter tank circuit, and the remaining one-third is coupled directly via line 26. Accordingly, the converter losses and the power ratings of the bridge transistors, the tank elements, the transformers and the bridge diodes, and the input and output capacitors may all be reduced by approximately one-third. This can represent significant savings in the cost, weight and size of the converter, and improved reliability as well. Obviously, the converters 18f–18h of FIGS. 7–9 do not provide the full input/output galvanic isolation of the converters 18d–18e of FIGS. 4–6, but a dual voltage automotive electrical system does not necessarily require full galvanic isolation between the upper and lower system voltages. Another, perhaps less obvious, advantage of the embodiments depicted in FIGS. 7–9 is that the transformer turns ratio changes to a value that reduces its cost of manufacture. In the embodiments of FIGS. 7–9, for example, the transformer T2 has a turns ratio of 1:1, which is more favorable for high frequency operation and lower cost. In general, 1:1 turns ratio transformers are easier and less costly to build, are more amenable to planar core designs. Together, the change in component power ratings and transformer design have been shown to provide a cost reduction on the order of 20% in a practical automotive electrical system mechanization.

As indicated above, the embodiments of FIGS. 6 and 9 illustrate a further converter topology variation in which a compounding coil pair (24 in FIG. 6, 24' in FIG. 9) excited by the load current in line 25 is connected in parallel with the primary winding P2 of the transformer T2. Otherwise, FIG. 6 is like FIG. 4, and FIG. 9 is like FIG. 7, but the compounding coil is applicable the embodiments of FIGS. 5 and 8 (and their variants) as well. In general, the compounding coils 24, 24' are configured to decrease in inductance with increasing load current, and are coupled to the tank circuit so that the output voltage Vout increases with increasing load current. This overcomes reductions in the output voltage Vout due to: (1) the forward conduction drop of the rectifier diodes (D2–D3 in FIGS. 4, 6, 7 and 9; D1–D8 in FIGS. 5 and 8); and (2) the load current dependence of output voltage Vout. With properly designed coil parameters, the output voltage Vout will be substantially independent of load current, and the conversion ratio actually achieved will match the design ratio, given the voltage ratio of the tank circuit transformer. While the coils 24, 24' are illustrated as being connected in parallel with the primary winding P2 of the tank circuit transformer T2, other configurations yielding a similar result are also possible. For example, the coils 24, 24' may be connected in parallel with the secondary winding(s) of the transformer, or in parallel with the inductor L2.

In summary, the system topologies presented in FIGS. 4–9, with the converters being operated at a fixed sub-resonant switching frequency, minimize switching loss as the converters can always operate with zero-current switching under all load conditions. This permits operation at very high frequencies in power stages that are capable of several hundred watts of output. At one kilowatt output it is practical to operate such converters at 1 MHz with MOSFET bridge transistors. Similarly, it is possible to use IGBT bridge transistors at switching frequencies as high as 500 KHz. With MOSFET bridge transistors, efficiency in excess of 95% has been demonstrated in the electrical system of FIG. 1. This also produces inherent soft-switching in both the bridge transistors and the diodes, yielding excellent EMII performance. This is especially true above 10 MHz, where hard-switched converters are often troublesome in EMI sensitive applications such as automotive electrical systems.

Additionally, each of the system topologies presented in FIGS. 4–9 features an inherent overload protection. In each embodiment, the converter output voltage Vout is very nearly determined by the expression Vout=k*Vin, where Vin is the input voltage, and k is a constant (0.333 in the embodiments of FIGS. 4–6, and 0.500 in the embodiments of FIGS. 7–9) determined by the transformer turns ratio and the transistor bridge configuration. For an input with a voltage source characteristic such as exists in an automotive electrical system, the converters 18c–18h preserve that characteristic at their output. However, when the 14V Loads 19 exceed a value above a maximum load point, up to and including a short circuit, the converters 18c–18h operate in a current limited mode. Thus, so long as the input voltage remains fixed at 42-volts, the converters 18c–18h exhibit a current source characteristic, and consequently, are inherently self-protecting against all overload conditions. This self-protection characteristic is achieved inherently (that is, without any means of closed loop control) by exciting the tank circuit at a switching frequency at or about one-half of the resonant frequency of the tank circuit.

The "overload point" as used above is defined as that point on the load curve where the circuit operation transitions abruptly from a constant voltage source characteristic to a constant current source characteristic as the load impedance decreases. The transition point depends on the characteristic impedance Zc of the series tank components, where $Zc=\omega(L/C)$. Specifically, the maximum output current capacity of the converter is inversely proportional to Zc and directly proportional to the input voltage Vin.

Thus, the present invention provides a novel DC-DC converter topology for an automotive dual voltage electrical system, in which a series resonant DC-DC converter is operated at a fixed sub-resonant switching frequency to provide a fixed voltage conversion ratio for powering low voltage electrical loads. The invention has been described in reference to the various embodiments, but as indicated, many other variations within the scope of this invention are also possible. Thus, the scope of this invention is not limited to the illustrated embodiments, but rather, is defined by the appended claims.

The embodiments of the invention in which an exclusive property or privilege in claimed are defined as follows:

1. A dual voltage automotive electrical system comprising in combination:

a regulated source of DC defining a first system voltage;

a series resonant converter coupled to said first system voltage for supplying power to a load circuit at a regulated second system voltage that is lower than said first system voltage, said converter including a series resonant tank circuit inductively coupled to said load circuit and comprising series resonant tank elements defining a dominant resonant frequency of said tank circuit, a transistor bridge circuit including alternately activated bridge transistors for supplying current from the regulated source of DC to the tank circuit, and a gate drive circuit for activating said bridge transistors at a fixed and predetermined switching frequency below said dominant resonant frequency of said, tank circuit to provide a fixed and predetermined voltage conversion ratio between said first and second system voltages.

2. The electrical system of claim 1, wherein the power supplied to said load circuit is inductively coupled from said tank circuit to said load circuit by an isolation transformer having a primary winding connected in said series tank circuit, and one or more secondary windings coupled to said load circuit through one or more rectifier elements.

3. The electrical system of claim 2, including a plurality of isolation transformers, each having a primary winding connected in said series tank circuit, and one or more secondary windings coupled to said load circuit through one or more rectifier elements.

4. The electrical system of claim 1, wherein the fixed and predetermined switching frequency of said gate drive circuit is about one-half of the dominant resonant frequency of said tank circuit.

5. The electrical system of claim 1, wherein said converter has an operating characteristic in which an output voltage supplied to said load circuit decreases with increasing current supplied to said load circuit, and said electrical system includes a compounding element inductively coupled to the load circuit and having an inductance that decreases with increasing current supplied to said load circuit by said converter, said compounding element being connected to said tank circuit so that its decreasing inductance overcomes said operating characteristic of said converter when the current supplied to said load circuit by said converter increases.

6. The electrical system of claim 5, wherein the power supplied to said load circuit is inductively coupled from said tank circuit to said load circuit by an isolation transformer having a primary winding connected in said series tank circuit, and said compounding element is connected in parallel with said primary winding.

7. The electrical system of claim 1, wherein said bridge transistors apply said first system voltage to said tank circuit such that all of the power supplied to said load circuit is coupled through the series tank circuit of said converter.

8. The electrical system of claim 1, wherein said bridge transistors are connected in series with said load circuit, and apply only a portion of said first system voltage to said tank circuit, so that a first portion of the power supplied to said load circuit is coupled through the series tank circuit of said converter, and a second portion of the power supplied to said load circuit is coupled directly from said regulated source of DC.

9. The electrical system of claim 8, wherein said first portion of the power supplied to said load circuit is inductively coupled from said tank circuit to said load circuit by at least one isolation transformer having a primary winding connected in said series tank circuit, and one or more secondary windings coupled to said load circuit through one or more rectifier elements, the primary and secondary windings having a turns ratio that determines an output voltage of the power supplied to said load, and relative magnitudes of said first and second portions.

10. The electrical system of claim 8, wherein said converter has an operating characteristic in which an output voltage supplied to said load circuit decreases with increasing current supplied to said load circuit, and said electrical system includes a compounding element inductively coupled to the load circuit and having an inductance that decreases with increasing current supplied to said load circuit by said converter, said compounding element being connected to said tank circuit so that its decreasing inductance overcomes said operating characteristic of said converter when the current supplied to said load circuit by said converter increases, whereby the power supplied to said load circuit has a voltage that is substantially independent of the current supplied to said load circuit by said converter.

* * * * *